United States Patent
Baker

(10) Patent No.: US 9,340,163 B2
(45) Date of Patent: May 17, 2016

(54) READY ACCESS FIREARM RELEASE

(71) Applicant: Daniel Shane Baker, Whitney, TX (US)

(72) Inventor: Daniel Shane Baker, Whitney, TX (US)

(*) Notice: Subject to any disclaimer, the term of this patent is extended or adjusted under 35 U.S.C. 154(b) by 88 days.

(21) Appl. No.: 14/037,379

(22) Filed: Sep. 26, 2013

(65) Prior Publication Data

US 2014/0231480 A1    Aug. 21, 2014

Related U.S. Application Data

(60) Provisional application No. 61/768,740, filed on Feb. 25, 2013.

(51) Int. Cl.
*B60R 7/14*      (2006.01)

(52) U.S. Cl.
CPC ...................... *B60R 7/14* (2013.01)

(58) Field of Classification Search
CPC ........... B60R 7/14; F41C 33/00; F41C 33/02; F41C 33/06; F41C 33/0272
USPC .................................................. 224/567, 196
See application file for complete search history.

(56) References Cited

U.S. PATENT DOCUMENTS

| | | | | |
|---|---|---|---|---|
| 1,430,081 A * | 9/1922 | Holler | ....................... | B60R 7/14 224/281 |
| 1,557,339 A * | 10/1925 | Sander | ...................... | B60R 7/14 224/542 |
| 4,800,822 A * | 1/1989 | Adkins | ........................... | 109/19 |
| 5,413,352 A * | 5/1995 | Persidsky et al. | ............. | 273/287 |
| 7,611,009 B2 * | 11/2009 | Youngs | .................. | A45C 11/00 206/361 |
| 8,186,188 B1 * | 5/2012 | Brown | .................... | E05G 1/005 109/45 |
| 9,021,840 B2 * | 5/2015 | Andrews | ................... | E05G 1/00 109/59 R |

* cited by examiner

*Primary Examiner* — Adam Waggenspack
(74) *Attorney, Agent, or Firm* — Jeffrey Roddy

(57) ABSTRACT

An apparatus adaptable for use within a vehicle that secures a firearm and enables rapid release of the firearm. The apparatus possesses intuitive and accessible controls permitting hands free operation requiring no visual inspection during use so a user can maintain his or her gaze on a perceived threat and rapidly obtain access to the firearm in the ready state.

3 Claims, 12 Drawing Sheets

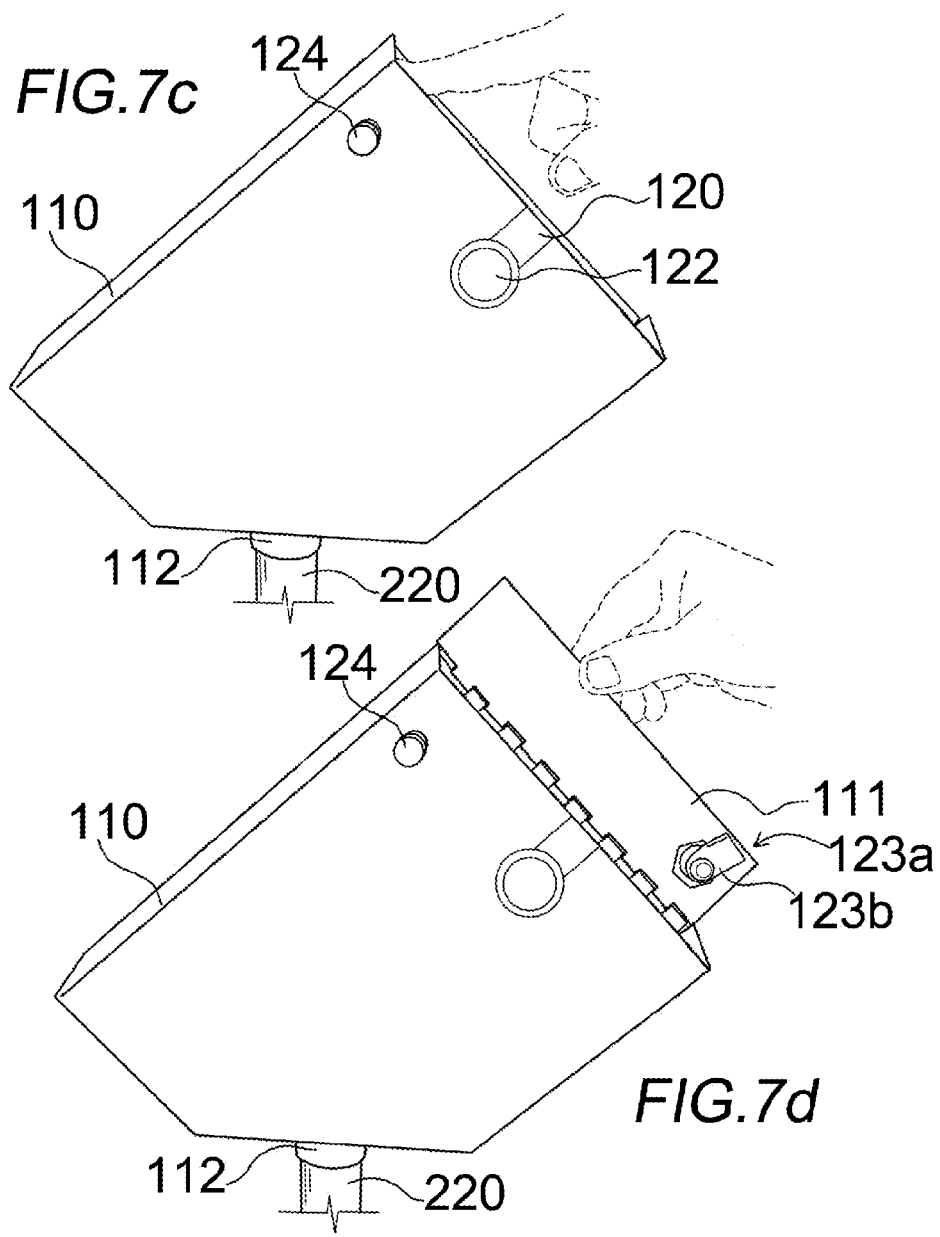

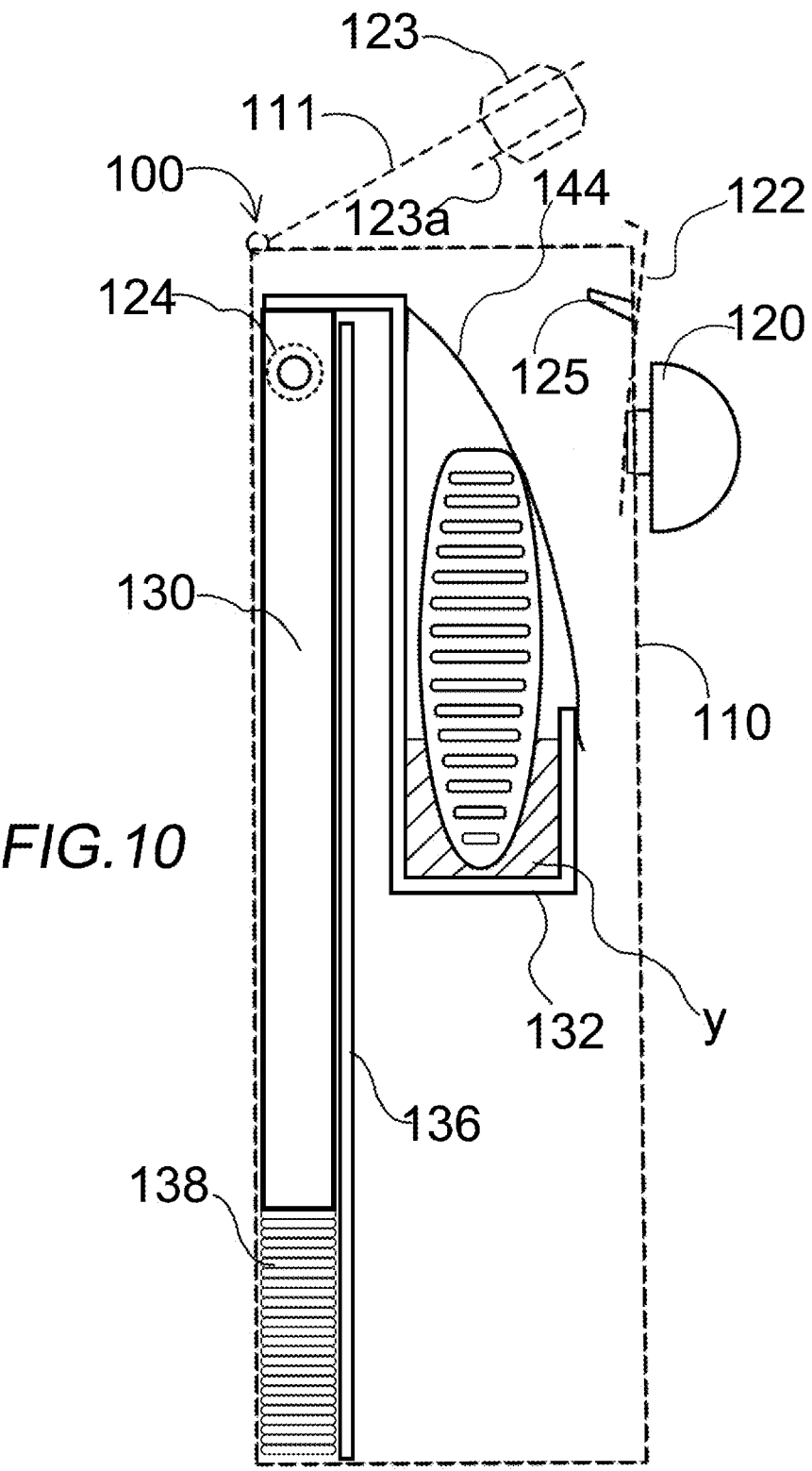

READY ACCESS FIREARM RELEASE

CROSS REFERENCE TO RELATED APPLICATIONS

This application claims the benefit of prior filed Provisional Patent Application No. 61/768,740 filed Feb. 25, 2013.

STATEMENT UNDER 37 CFR.155 OR 1.78

This application filed on or after Mar. 16, 2013 which claims benefit or priority to an application filed before Mar. 16, 2013, contains one or more claims not entitled to a filing date before Mar. 16, 2013.

FIELD

The present invention relates generally to firearm security and more particularly to a firearm release apparatus and safe for firearms.

BACKGROUND

Laws regarding the transport of guns vary by state. In the state of Texas for example, a non-felon private citizen may transport a hand gun in his own vehicle or a vehicle under his control if the hand gun is stored out of plain sight. With this in mind, guns are frequently stored in a glove compartment, under the seat or a console between seats. This presents a problem if the gun owner requires ready access to the gun for personal protection because the hand gun cannot be accessed quickly, and in any event, is not stored in a glove compartment or console in a ready state.

Gun safes having an integrated release for a hand gun are known in the art. U.S. Pat. No. 1,557,339 to Sander describes a gun case with a spring actuated release mechanism that is tensionably held against a case door and extends a hand gun from the case when the door is opened. U.S. Pat. No. 6,570,501 describes a hand gun case with a sliding mechanism on which a hand gun rides, and which extends from the case carrying the hand gun when identity verification, i.e., fingerprint identification, is provided.

Although the foregoing provide improvements in hand gun access, problems remain. One problem involves the securing of the case doors wherein a key must be turned or biometric identification provided before the door will open and the hand gun becomes available. Biometric identification does not work in all cases and with all people. Keys can become lost or dropped.

Commonly, law enforcement officers possess a back up firearm that may be carried in a police vehicle. Such a firearm must be reasonably accessible when the officer is present yet secured when the officer is away from the vehicle.

It would be desirable to provide a gun safe/case that permits a firearm to be secured by keyed lock, combination lock or other means wherein the case contains a gun carriage supporting the hand gun in a ready-to-use state when a rail of the carriage is extended therefrom.

It would be desirable to provide a gun safe/case that is readily mountable inside a vehicle whereby ready access to the gun is obtained by tapping a release of the case.

It would be especially desirable to provide a gun safe/case including a quick release mechanism for installation on the interior driver's side of a vehicle that can be actuated without the use of hands or requiring a user to visually inspect the case as a precursor to activating the release mechanism.

SUMMARY

The present invention is an apparatus including a compartment allowing the rapid release of a firearm which is presented to a user in a ready state. The apparatus comprises a compartment that is lockable and adapted for installation in a vehicle in a preferably freestanding position. The compartment includes a quick release knob on a side of the compartment that it can be located and pressed without having to visually inspect the apparatus and without the use of hands when required.

In one aspect, a firearm secure and release apparatus comprises a compartment housing an extendable gun support and a door that can be either closed and locked, open and unlocked or closed and unlocked whereby the door in the closed and unlocked state is released by a knob sized and shaped to enable actuation by a hand or knee if a user is in a seated position and whereby the support carrying the gun is extended from an opening in the compartment.

In another aspect, a firearm secure and release apparatus comprises a compartment containing an extendable gun support and a door that can be either closed and locked, open and unlocked or closed and unlocked whereby the door in the closed and unlocked state can be released by a knob sized and shaped to enable actuation without having to visually inspect the device or feel for a handle, key or combination.

In yet another aspect, a firearm secure and release apparatus comprises a compartment housing an extendable gun support and a door that can be either closed and locked, open and unlocked or closed and unlocked whereby the door in the closed and unlocked state can be released by a knob sized and shaped to enable actuation by a hand or knee if a user is in a seated position and whereby the gun is extended from the compartment opening and presented to the user in a ready state with the grip free hanging, unencumbered and in a down position.

In still another aspect, a firearm secure and release apparatus comprises a case for housing a firearm that is a rifle or shotgun wherein the firearm is temporarily stored and secured within the case and release therefrom by extendable supports when a knob on the case is depressed by a user whereby the gun is presented in a ready state.

Advantageously, the firearm release apparatus can be used while permitting a user to keep his or her eyes on a perceived threat.

Advantageously, the firearm release apparatus installs readily in a vehicle at a desirable angle and will not interfere with the functioning of the steering, shifting or other aspects and features of the vehicle.

The foregoing and other objects, features, and advantages of the invention will become more apparent from the following detailed description, which proceeds with reference to the accompanying figures wherein the scale depicted is approximate.

BRIEF DESCRIPTION OF THE DRAWINGS

FIGS. 7a-7e show in a sequence, an extended hand gun, pushing the support of the hand gun back into compartment 110 until it locks in place, shutting the compartment door, and locking the compartment with key;

FIGS. 10 and 11 depict an alternate embodiment according to the present invention for the quick release of a rifle.

DETAILED DESCRIPTION OF THE INVENTION

Figure 1:
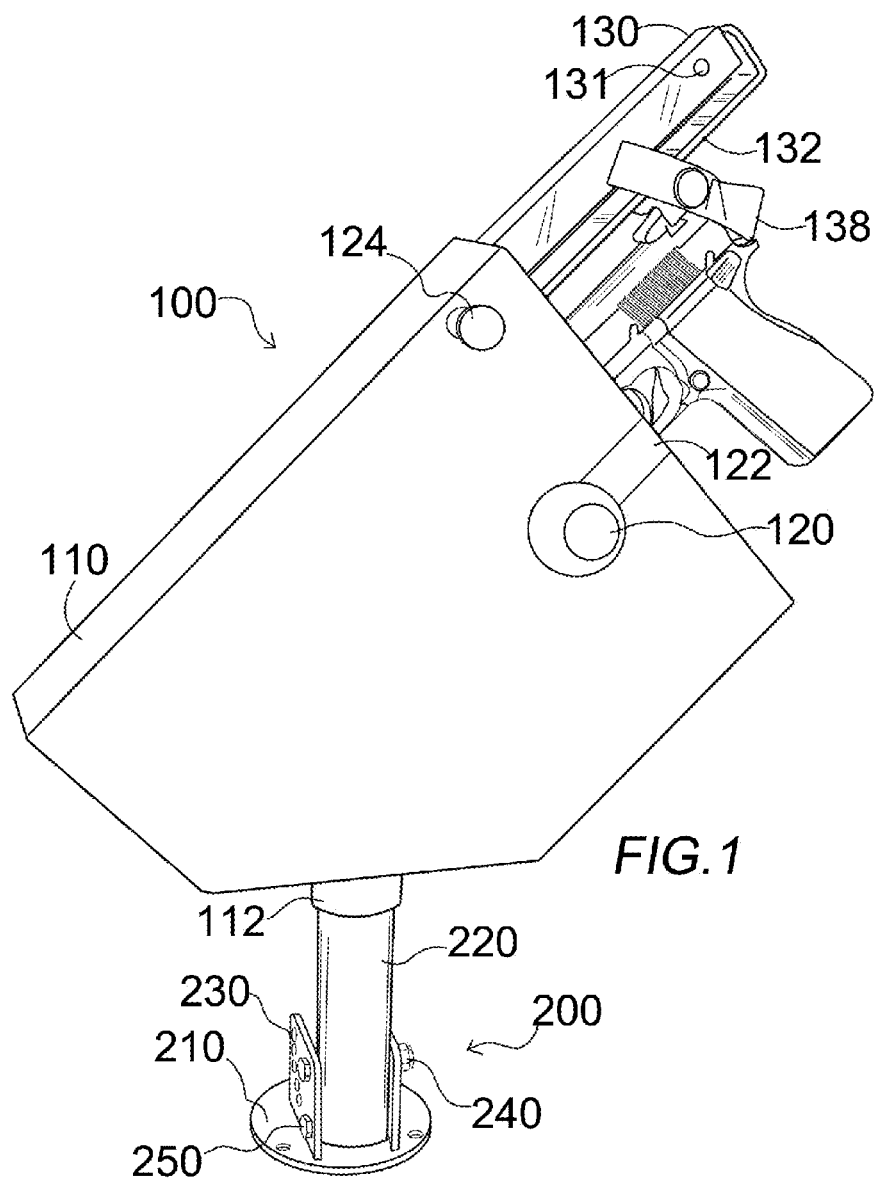
FIG. 1 shows a preferred embodiment according to the present invention.

Reference Listing:
100 release assembly
110 compartment
111 door
112 post cup
120 door release knob
122 door release
123a compartment lock
123b cam
124 carriage release
124a spring pin housing
125 fixed catch
128 carriage assembly
130 rail
131 recess
132 support member
134 barrel support post
136 slide rail guide
138 spring
140 stop
142 bracket
144 strap
200 mounting post assembly
210 mounting plate
220 post
230 angle adjustment plate
240 post pin
250 angle adjustment pin
300 firearm
Definitions In the following description, the term "gun" or "firearm" refers generally to any type of portable gun and the rapid deployment of same by an individual. The term "ready state" refers to a position that instantly permits a user's grasping the gun without having to unholster or otherwise bypass obstructions in order to manipulate the weapon. The terms "case" and "safe" or "compartment" are interchangeable and refer to housings that can house at least one weapon and which can be secured when desired. The term "hands free" refers to such features that enable actuation of features of the present invention without the use of the hands. The term "eyes free" refers to such features that enable actuation of a release mechanism that will extend the firearm from the housing without having to divert one's eyes from a perceived threat. The term "lock" can refer to keyed locks, combination locks, punch button locks and other locks which will suggest themselves to those having skill in the art and access to this disclosure. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references mentioned herein are incorporated by reference in their entirety for all purposes. In case of conflict, the present specification, including explanations of terms, will control. In addition, the materials, methods, and examples are illustrative only and not intended to be limiting.

Referring generally to FIGS. 1 through 9b a ready access firearm release apparatus comprises a compartment 110 having an extendable gun support carriage 128 within the compartment that automatically extends when carriage release 124 is disengaged and release knob 120 is tapped. The carriage which includes a rail 130, rail guide 136 and gun support member 132 with barrel post 134 extends and exposes the hand gun 300 in a ready state, i.e., with the grip unencumbered and in a vertical presentation. While in the embodiment depicted, the support carriage is spring actuated, other means to extend the gun from the compartment such as a gas piston or using elastomeric elements can be employed without departing from the present invention.

FIG. 1 shows a preferred embodiment of a firearm release apparatus with compartment 110 atop mounting assembly 200 which allows installation to the floorboard of a vehicle. An angle adjustment plate 230 allows mounting plate 210 to attach to non-level surfaces. In the figure shown, an extendable hand gun support projects from the compartment. Strap 138 is typically positioned behind the rear sight or between the hammer and back strap of the hand gun.

Figure 2:
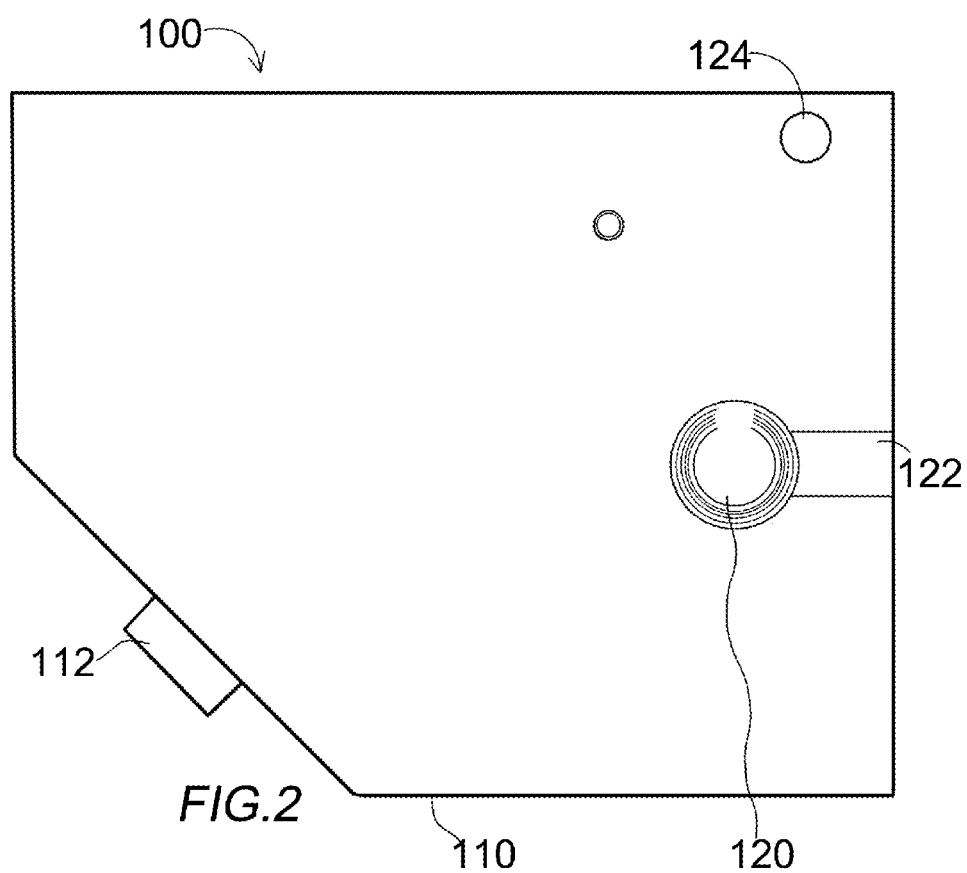
FIG. 2 is a side plan view of compartment 110 according to the embodiment shown in (FIG. 1)

FIG. 2 is a side plan view of compartment 110 according to a preferred embodiment of the present invention depicting carriage release 124, door release knob 120 and door release 122.

Figure 3:
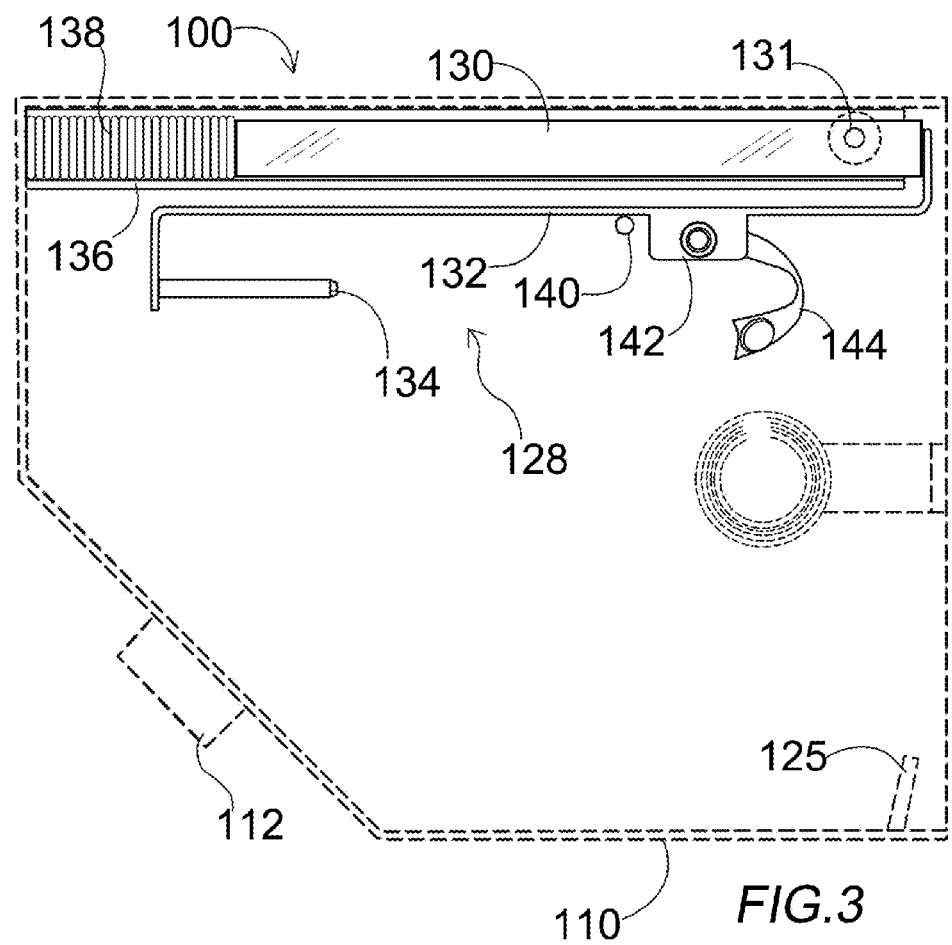
FIG. 3 is a side plan view showing a carriage assembly within compartment 110.
Figure 4A:
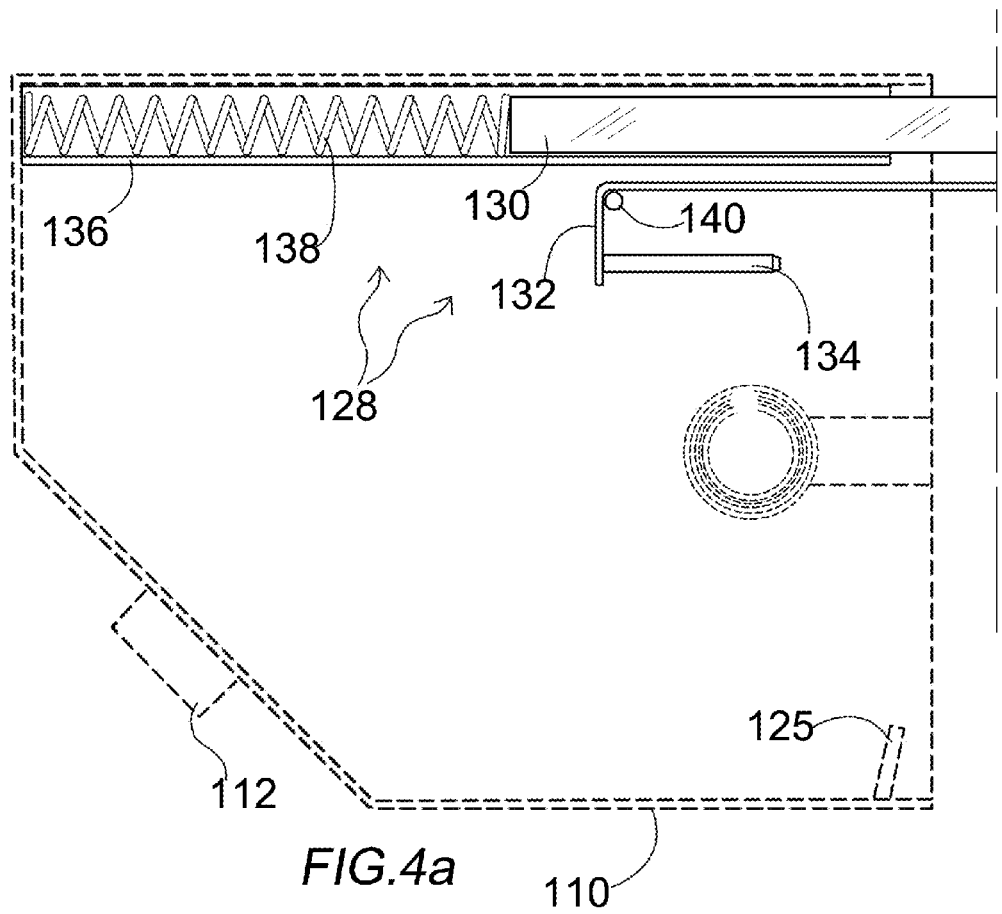
FIGS. 4a and 4b show a side plan view with carriage assembly of (FIG. 3) partially extended.
Figure 4B:
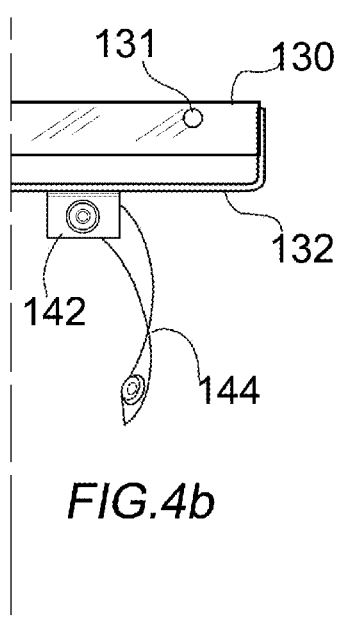

FIG. 3 is a side view showing the interior of compartment 110 and carriage assembly 128 in a unextended position including extendable rail 130, rail guide 136, a coil spring 138 residing inside of the guide, hand gun support member 132 which is attached to an end of the extendable rail, and barrel post 134 projecting from the support member. Also shown are steady bracket 142 for cradling the rear sight and strap 144. In order to install a hand gun in the compartment, the barrel of the gun is placed over post 134 which supports the gun substantially parallel to the extendable rail. The rear sight is placed beneath steady bracket 142 with strap 144 behind the rear sight, hammer or lower according to user preference FIGS. 4a and 4b show rail 130 extended. Length of travel of support member 132 is determined by stop 140 which is a transverse peg fixed to the case walls by welding or other means.

Figure 5:
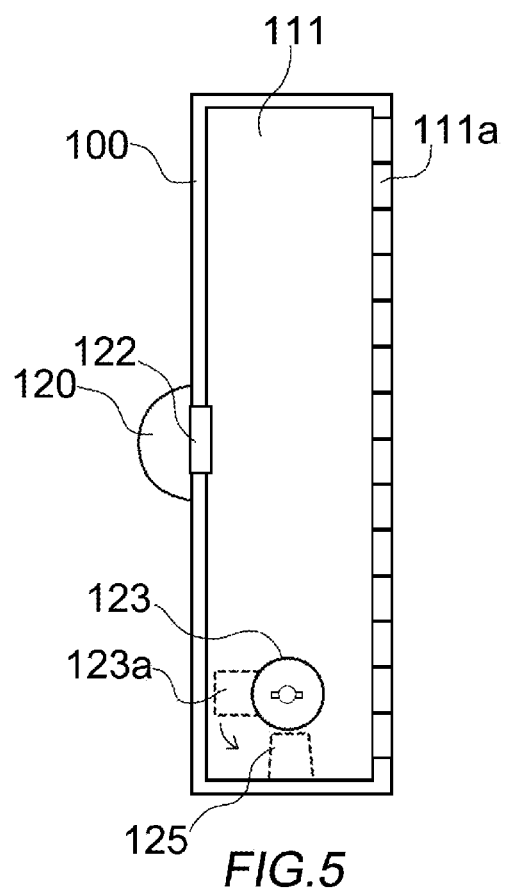
FIG. 5 is a front view of the embodiment of (FIG. 2) taken in the direction of arrow (a), with compartment door 111 closed.
Figure 6:
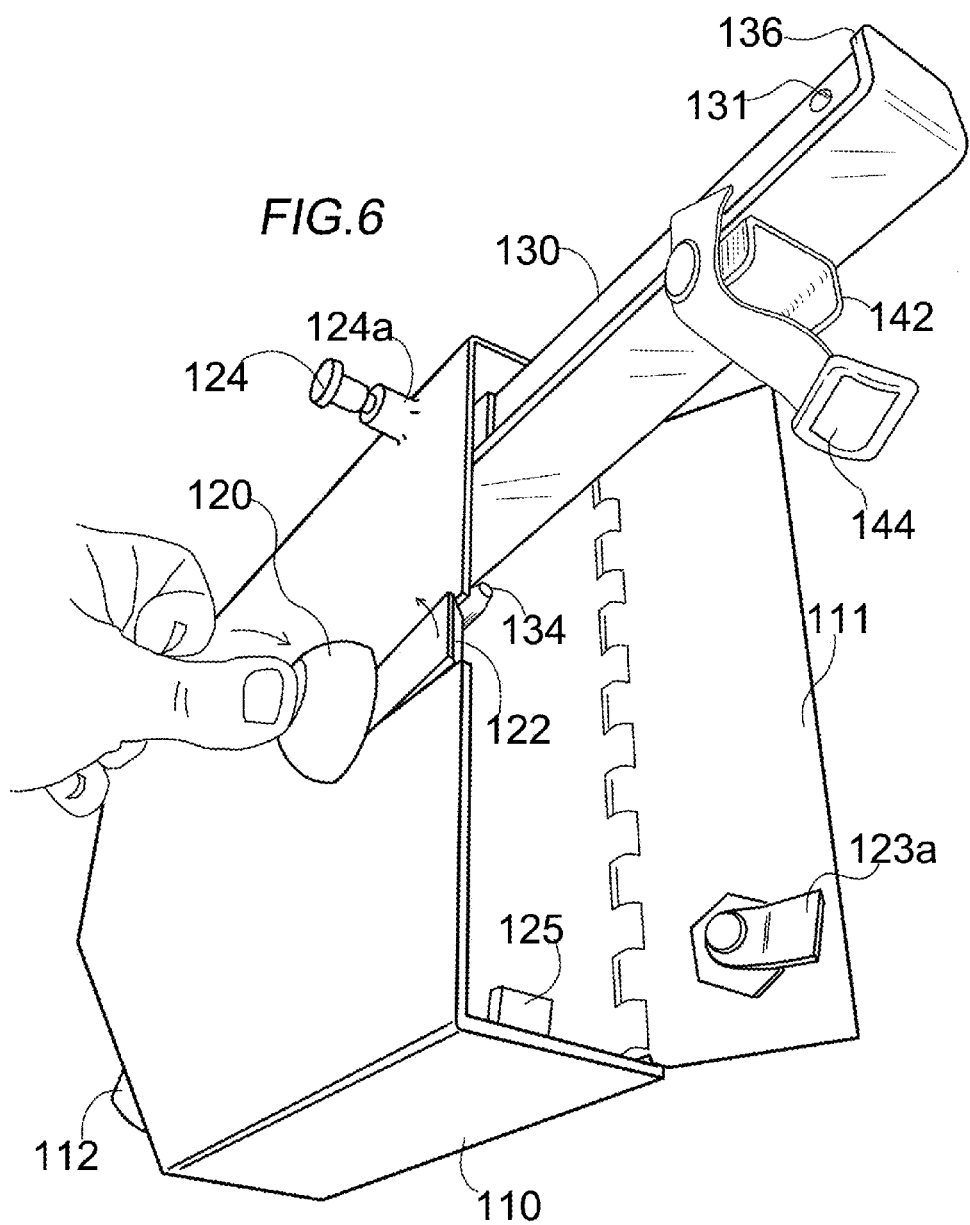
FIG. 6 is a perspective view of compartment 110 with door 111 opened and spring actuated rail 130 extended therefrom.
Figure 7A:
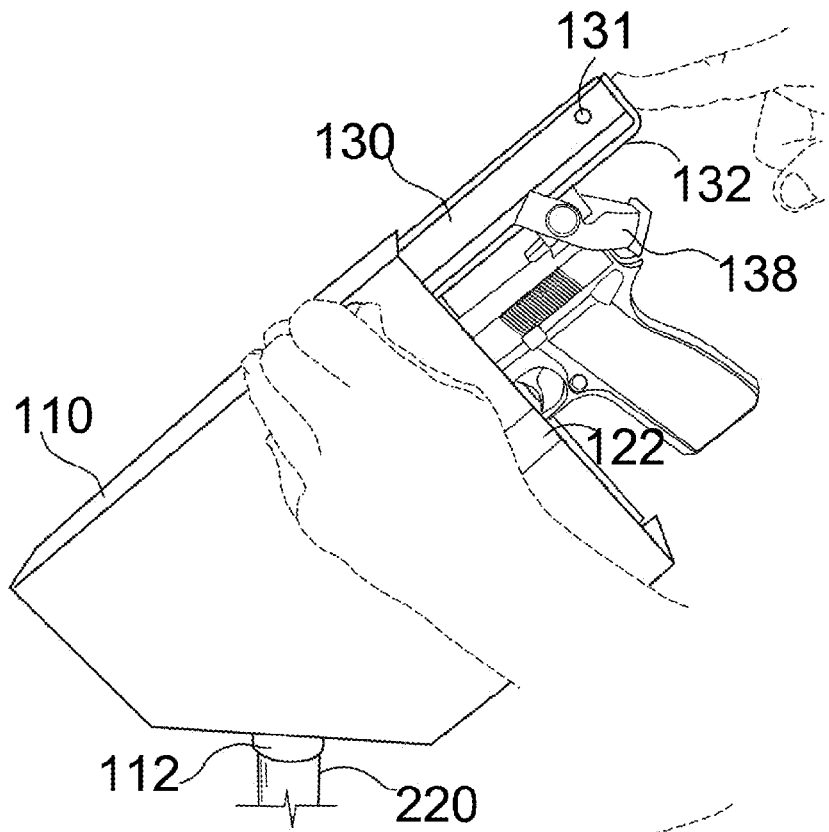
Figure 7B:
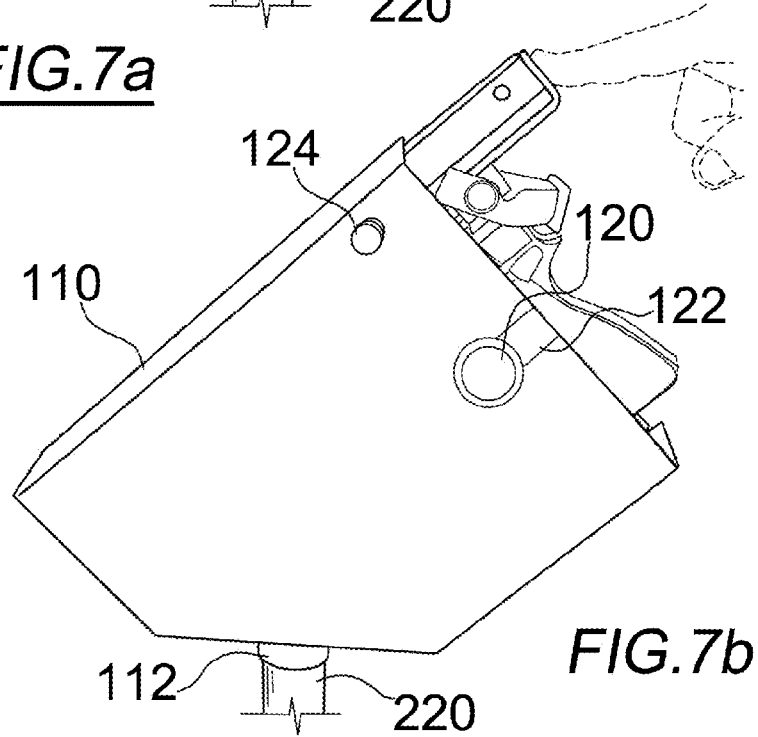
Figure 7E:
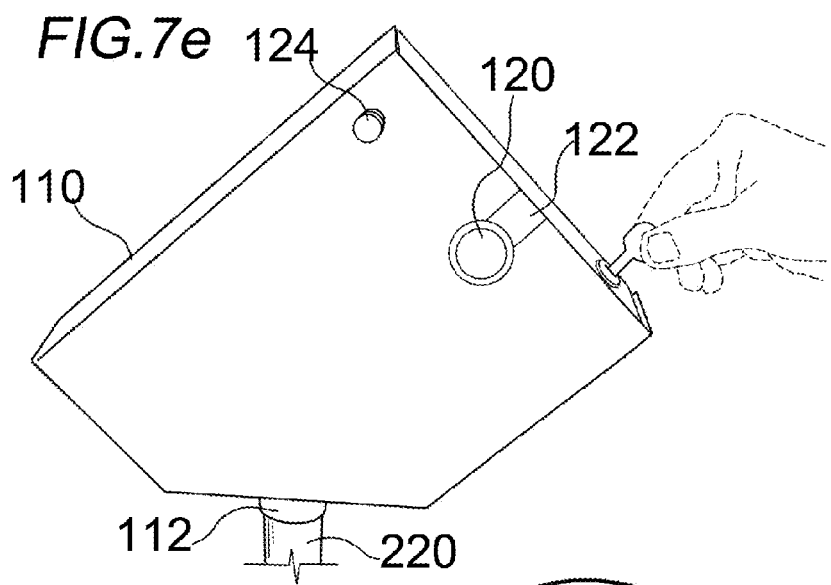

FIG. 5 is a front plan view of the compartment showing door 111. Typically the hinged 111a door is held in place by door release 122 and is released by pressing against release knob 120 which forces the catching end of the door release abutting the door lip up and away from the door. When the carriage release lock 124 is disengaged, and the compartment door is closed and retained by the door release, rail 130 is tensionably forced against the rear of the door. Carriage release 124 includes a knob connected to a retractable spring pin (not shown) that when engaged, seats in recess 131 thereby arresting forward movement of the rail when the rail is in the unextended position. When it is desired that the apparatus be configured to release the hand gun when the release knob is pressed, the door must be unlocked as depicted. When the door is released, the rail is allowed to extend carrying the hand gun. In FIG. 6 for purposes of conciseness and clarity, the hand gun has been omitted. Door release 122 is a pivoting rocker plate or teeter board separate from the compartment held in place by a hinge pin (not shown) joined to the compartment. The door release is normally biased in a down position flush with the side panel of the compartment except when the proximal end is forced down by pressing release knob 120 causing the distal end of the door release normally in contact with the door lip to lift, permitting the door to swing open. The compartment door can be secured by rotating cam lock 123a by key, which positions the cam lock plate behind fixed catch 125.

FIGS. 7a-7e depict in sequence steps for compressing the extendable rail back into the compartment, which include disengaging carriage release 124, pressing rail 130 into the compartment opening until the carriage release pin secures the rail by mating with recess 131, and shutting the door.

Figure 8:
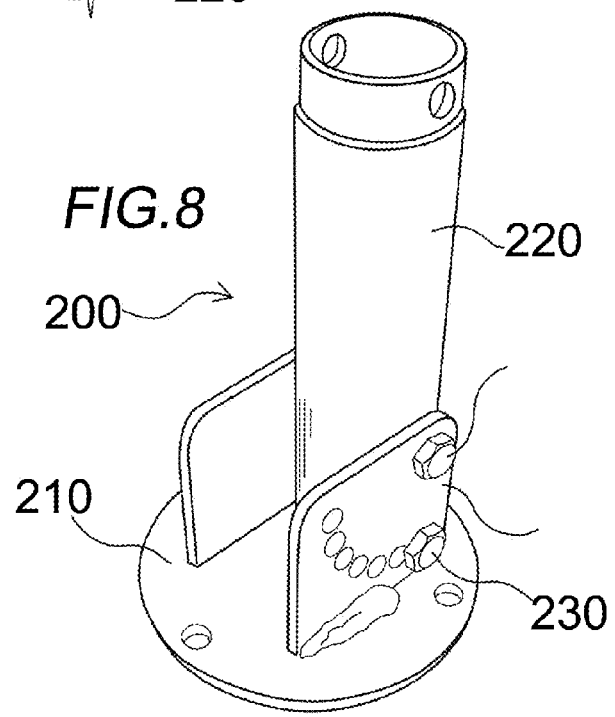
FIG. 8 is a perspective view of support post 220.

FIG. 8 is an enlarged view of mounting post assembly 200 which includes a mounting plate 210 for attachment to the floor of a vehicle, angular adjustment plate 230 and support post 220 for insertion into post cup 112 of compartment 110.

Figure 9A:
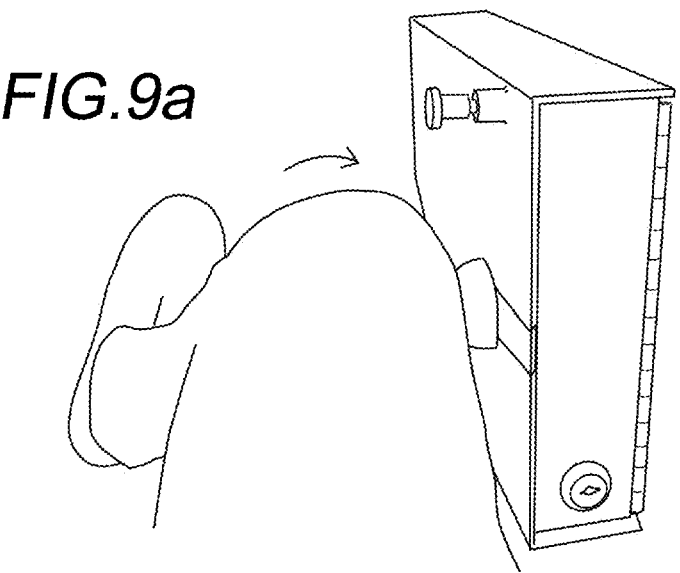
FIGS. 9a and 9b show in sequence actuation of the release by a user's knee.
Figure 9B:
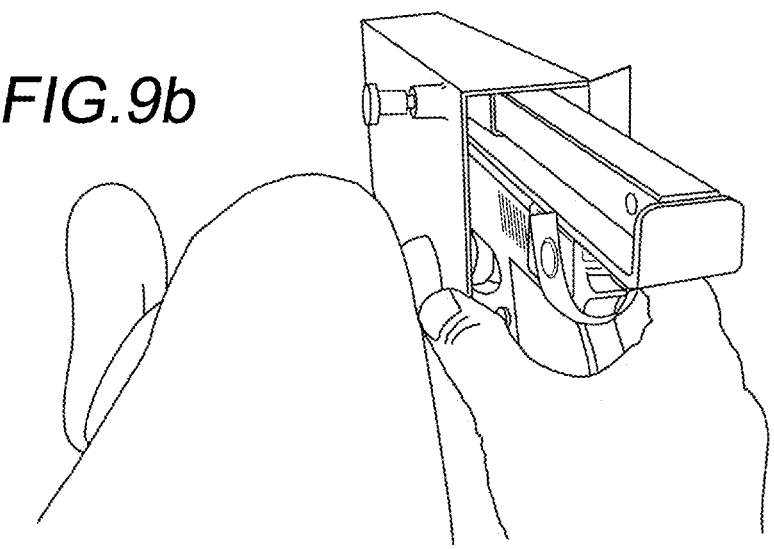

FIGS. 9a and 9b depict in sequence a vehicle mounted firearm release and actuation by striking release knob 120 with a knee.

Although the embodiment described herein shows a compartment sized for a hand gun, compartment 110 can be upsized to accommodate a larger firearm such as an assault rifle. In this case, the rifle would be supported transverse the carriage assembly rather than inline as depicted. Although in the embodiment depicted, extendable rail 130 is unitary, telescoping rails of whatever profile or nested tubing can be used without departing from the present invention. Likewise, although the release knob is rounded for ease of use, it is intended that other shapes and sized of release knobs or levers can be used with departing from the present invention.

Figure 11:
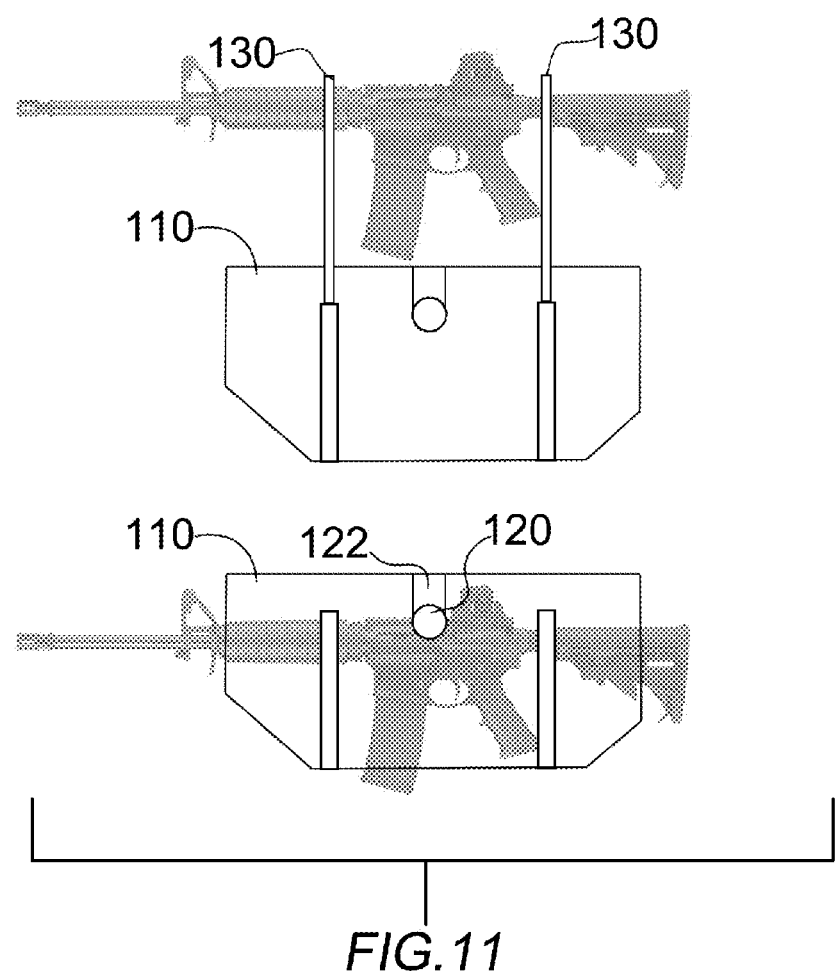

FIGS. 10 and 11 depict an alternate embodiment according to the present invention for the secure retention and rapid release of a rifle. Like the embodiment intended for use with hand guns, it comprises a compartment 110 shown in dotted line and within the compartment an extendable gun support carriage 128 that automatically extends when carriage release lock is disengaged, release knob 120 is tapped and door release 122 is tilted thereby opening door 111. The carriage which includes a rail 130, rail guide 136 and gun support member 132 extends and exposes the rifle 300 in a ready state. No barrel post is employed with the alternate embodiment. Preferably the rifle is supported within the compartment by at least one yoke (y) as part of the support member 132 attached to the rail guide which at least partially surrounds a section of the rifle. A strap 144 of nylon webbing, plastic or other suitable material closes the gap of the yoke and ensures that the rifle is retained securely within the yoke after extension from the compartment. The strap is preferably fastened securely at one end to the yoke, while at the other end possesses a catch or fastening means which can be a snap, hook and loop fasteners, magnet, electromagnet or other means that will suggest themselves to those skilled in the art having access to this disclosure which is easily unfastened or unclasped, and which can be automatically released once the rifle is fully extended. It is conceivable that retention strap 144 can employ electromagnetic release means whereby current to an electromagnet clasp of the strap is discontinued once the pistol or rifle is fully extended from the compartment, thereby disengaging the strap from at least one attachment point. The compartment holding the rifle can be mounted on a wall, the inside roof of a vehicle, between vehicle seats or other suitable location. The compartment can possess a U-shape without side panels wherein portions of the firearm extend from the ends when stored; see FIG. 11. In this configuration, the rifle is prevented by the yoke(s) from being removed through the ends of the compartment.

It should be understood that the drawings and detailed description herein are to be regarded in an illustrative rather than a restrictive manner, and are not intended to be limiting to the particular forms and examples disclosed. Accordingly, it is intended that this disclosure encompass any further modifications, changes, rearrangements, substitutions, alternatives, design choices, and embodiments as would be appreciated by those of ordinary skill in the art having benefit of this disclosure, and falling within the spirit and scope of the following claims.

What is claimed is:

1. A quick release apparatus for providing a firearm in a ready state comprising:
   (1) a housing with a top side, bottom side, front side, back side, left side and right side, with a door on the front side that can be open, closed and secured and closed and unsecured,
   (2) a carriage assembly including a barrel support post and a slidable support member for a firearm wherein the support member is reversibly extendable from the housing and superior to the firearm, and configured to hang the firearm in a vertical disposition when extended from the housing and expose all sides of a pistol grip and trigger for immediate access to the pistol grip and trigger;
   (3) a depressible door release member on the left or right side of the housing, configured to permit hands free and eyes free actuation of the slidable support by depressing the door release member;
   (4) on the housing, a reversibly engageable safety member having portions configured to automatically engage with the slidable support member of the carriage assembly and restrain the slidable support member in a contracted position when the carriage assembly is contracted fully into the housing and irrespective of door position, and wherein when the door is closed, and the reversibly engageable safety member is manually disengaged, the slidable support is in a ready state for spontaneous extension when the door release is actuated by the depressible door release member; and,
   (5) a mounting member configured to mount the quick release apparatus to an interior surface of a vehicle in a position for hands free actuation by a user's knee.

2. The apparatus according to claim 1 further comprising a slidable support release that when engaged, maintains the slidable support in a secured contracted position.

3. The apparatus according to claim 1 wherein the housing door can at least be closed and locked with the carriage retracted and the reversibly engageable safety in an engaged or disengaged state, closed and unlocked with carriage retracted and a reversibly engageable safety in an engaged or disengaged state, or open and unlocked while maintaining the supported firearm in a secured contracted position within the housing.

* * * * *